US010262284B2

(12) United States Patent
Gooijer et al.

(10) Patent No.: US 10,262,284 B2
(45) Date of Patent: Apr. 16, 2019

(54) INVENTORY MANAGEMENT SYSTEM FOR COMPLEX PACKS

(71) Applicant: Oracle International Corporation, Redwood Shores, CA (US)

(72) Inventors: Steven Irene Andre Gooijer, Maple Grove, MN (US); Charles J. Hahr, Jr., Roberts, WI (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 934 days.

(21) Appl. No.: 14/565,588

(22) Filed: Dec. 10, 2014

(65) Prior Publication Data

US 2016/0171408 A1    Jun. 16, 2016

(51) Int. Cl.
    *G06Q 10/06*     (2012.01)
(52) U.S. Cl.
    CPC .............. *G06Q 10/06315* (2013.01)
(58) Field of Classification Search
    CPC ............ G06Q 10/06315; G06Q 10/06
    See application file for complete search history.

(56) References Cited

U.S. PATENT DOCUMENTS

| | | | | |
|---|---|---|---|---|
| 6,516,301 | B1 * | 2/2003 | Aykin | G06Q 10/06315 |
| | | | | 705/7.25 |
| 7,543,743 | B1 * | 6/2009 | Yu | G06Q 10/087 |
| | | | | 235/375 |
| 8,032,391 | B2 * | 10/2011 | Erie | B65B 5/00 |
| | | | | 705/1.1 |
| 8,036,940 | B2 | 10/2011 | Hull et al. | |
| 2001/0027418 | A1 | 10/2001 | Johnson | |
| 2003/0171962 | A1 * | 9/2003 | Hirth | G06Q 10/06315 |
| | | | | 705/7.25 |
| 2004/0172341 | A1 * | 9/2004 | Aoyama | G06Q 10/08 |
| | | | | 705/26.1 |
| 2005/0283411 | A1 * | 12/2005 | Rhea | G06Q 10/00 |
| | | | | 705/28 |
| 2008/0120129 | A1 * | 5/2008 | Seubert | G06Q 10/06 |
| | | | | 705/35 |
| 2009/0319401 | A1 * | 12/2009 | Rao | G06Q 10/087 |
| | | | | 705/29 |
| 2011/0070333 | A1 * | 3/2011 | Boer | C12N 9/82 |
| | | | | 426/49 |
| 2016/0062347 | A1 * | 3/2016 | Aqlan | G05B 19/418 |
| | | | | 700/99 |

* cited by examiner

*Primary Examiner* — Mehmet Yesildag
(74) *Attorney, Agent, or Firm* — Potomac Law Group, PLLC (57) ABSTRACT

An inventory management system performs inventory management for complex packs. The inventory management system receives a request to estimate inventory for a complex pack. The inventory management system then determines, based on a data indicator stored in an accounting database, whether inventory for the complex pack is held at component level or at pack level. When inventory is held at component level, the inventory management system determines an estimate complex pack inventory based on component inventories and number of components in the complex pack.

20 Claims, 9 Drawing Sheets

INVENTORY MANAGEMENT SYSTEM FOR COMPLEX PACKS

FIELD

One embodiment is directed generally to a computer system, and in particular, to an inventory management computer system.

BACKGROUND INFORMATION

Inventory management includes specifying percentages or quantities of stocked goods. It is required at different locations within a facility or within many locations of a supply network. The scope of inventory management includes replenishment lead time, carrying costs of inventory, asset management, inventory forecasting, inventory valuation, inventory visibility, future inventory price forecasting, physical inventory, available physical space for inventory, quality management, replenishment, returns and defective goods, and demand forecasting. Balancing these competing requirements leads to optimal inventory levels, which is an on-going process as the business needs shift and react to the wider environment.

Inventory management for a retailer involves seeking to acquire and maintain a proper merchandise assortment, while ordering, shipping, handling, and related costs are kept in check. It also involves systems and processes that identify inventory requirements, set targets, provide replenishment techniques, report actual and projected inventory status, and handle all functions related to the tracking and management of material. Inventory management is a crucial aspect of a retail business since keeping accurate track of the available stock can, for example, prevent lost sales opportunities caused by out of stock items.

SUMMARY

One embodiment is a system that performs inventory management for complex packs. The system receives a request to estimate inventory for a complex pack. The system then determines, based on a data indicator stored in an accounting database, whether inventory for the complex pack is held at component level or at pack level. When inventory is held at component level, the system determines an estimate complex pack inventory based on component inventories and number of components in the complex pack.

DETAILED DESCRIPTION

Embodiments provide inventory management for complex packs. In one embodiment, complex pack inventory is tracked when a complex pack is "built" (e.g., a customer buys a combination of individual components that form a complex pack) or when a complex pack is "broken down" (e.g., a customer buys only a subset of components out of an existing complex pack). A data unit or data indicator provides the option to track a pack at component level or at pack level. Another data unit or data indicator provides the option to calculate virtual pack quantities or stock on hand ("SOH") based on component quantities for both single level and multi-tier packs. Accordingly, embodiments can accurately track packs in the event of pack "build" or "breakdown."

Figure 1:
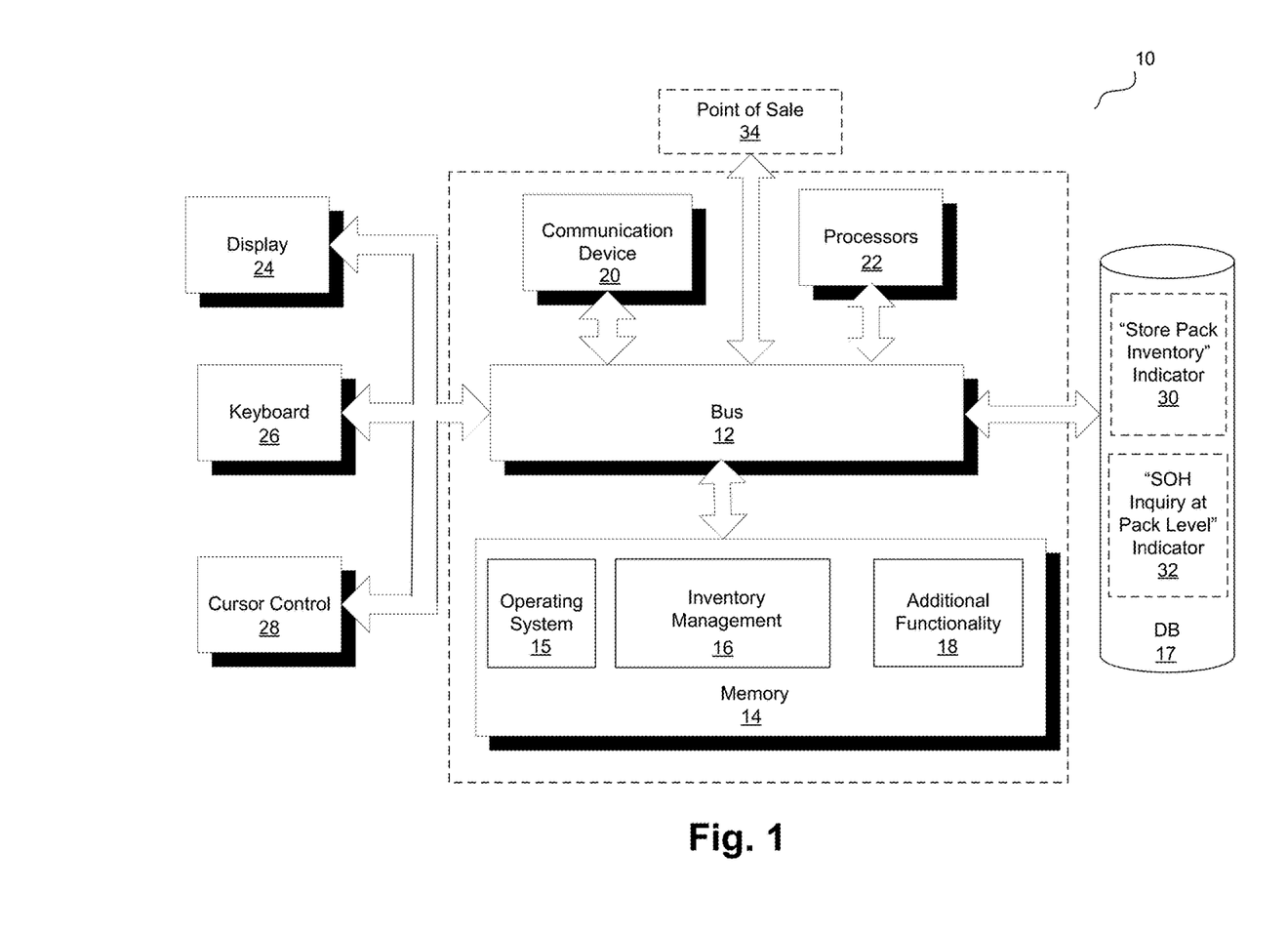
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include an inventory management module 16 for providing inventory management for complex packs, and all other functionality disclosed herein. System 10 can be part of a larger system, such as added functionality to the "Oracle Retail Store Inventory Management" from Oracle Corp. Therefore, system 10 can include one or more additional functional modules 18 to include the additional functionality. A database 17 is coupled to bus 12 to provide centralized storage for modules 16 and 18.

In one embodiment, database 17 may include a "Store Pack Inventory" indicator 30 and an "SOH Inquiry at Pack Level" indicator 32 that are data unit or data indicators defined and stored in database 17, and used for providing complex pack processing, and all other functionality disclosed herein. A "complex pack," in general, is a group of components that include at least two different items. "Store Pack Inventory" indicator 30 may indicate whether to track a pack at component or pack level, and "SOH Inquiry at Pack Level" indicator 32 may indicate whether or not to calculate SOH for a pack based on component quantities.

In one embodiment, computer system 10 may function as, or may communicate with, a point of sale ("POS") device 34 for providing complex pack processing, and all other functionality disclosed herein. POS (also called checkout) is the place where a retail transaction is completed, e.g., a point at which a customer makes a payment to the merchant in exchange for goods or services. At POS, the retailer may calculate the amount owed by the customer, provide options for the customer to make payment, and also normally issue a receipt for the transaction. POS in various retail industries uses customized hardware and software as per their requirements. Retailers may utilize weighing scales, scanners, electronic and manual cash registers, electronic funds transfer at POS ("EFTPOS") terminals, touch screens, and any other wide variety of hardware and software available for use with POS. For example, a grocery or candy store may use a scale at POS, while bars and restaurants may use software to customize the item or service sold when a customer has a special meal or drink request.

Generally, at retail stores, a complex pack may be informally "formed" or "built" when a customer selects several items. Complex packs may also be "broken down" when a customer grabs one or more items out of an existing complex pack. An example of informally "building" a complex pack would be selling a hot dog that consists of a bun, a wiener, and a bag of mustard. This combination is sold as a unit, while the constituent items are bought and stored in inventory as individual items. An example of "breaking down" a complex pack would be when a customer grabs a single item out of a complex pack, e.g., a snickers bar out of a mixed box of snickers and mars bars, while the box can also be sold as a whole unit.

With known systems, such informal "builds" and "breakdowns" of items may make it difficult to keep track of accurate complex pack quantities. For example, convenience stores, grocers, or other retailers that purchase items at individual units, but sell them together as a single pack unit, may run into inefficiencies and enterprise inconsistencies because of the manner in which inventory is held in the inventory management system. In one example, customers may purchase items such as shampoo and conditioner at an individual component level, but these items may also be sold together as a unit (i.e., a complex pack). For example, an individual bottle of conditioner may be sold for $5.99 and a bottle of shampoo may be separately sold for $5.99, but if the shampoo and conditioner are purchased as a shampoo/conditioner complex pack, the customer may buy both for $10. Accordingly, it is possible that the inventory is received at component level, but sold at either component or pack level. In another example, customers do not buy octane additive individually but rather as part of fuel. However, the retailer buys octane additive individually, and the type of gas the customer buys depends on the amount of additive used. Accordingly, it is possible that the inventory is received at component level but sold only at pack level.

One known solution to this problem is that some inventory management systems update inventory at pack level for any items that are sold as a complex pack. One disadvantage with this known approach is that if an item was ordered and received at component level but sold as part of a complex pack, updating inventory at pack level causes a discrepancy in the stock on hand ("SOH"). If the item was received as a component item, the SOH of the item gets updated. If it is then sold as part of a complex pack, the inventory management system updates the SOH of the complex pack. In some cases, this is an inaccurate reflection of the SOH. Such updating of the SOH of the complex pack item may be correct for certain items that cannot be separated, such as gift baskets or promotional items, but may not be correct for many other items, such as shampoo kits, hot dogs, fuel, and many grocery items.

In contrast to the known systems, one embodiment of the present invention allows the user to indicate, during complex pack setup, if a complex pack has inventory or if inventory is held with its components, and if the system should calculate in real time how many possible packs might exist based on the component quantities.

One embodiment provides item level configurability to indicate if physical inventory of a pack is tracked at pack level (i.e., physical pack) or at component level (i.e., virtual pack) and using that physical or virtual pack on inventory transactions such as stock counts, inventory adjustments, shipping, and receiving. As opposed to a physical pack that is defined and held in inventory at pack level, a virtual pack is a complex pack that does not exist until it is "formed" or "built" (e.g., by a customer) and sold. A complex pack can have additional packs embedded, and the embedded packs can have the same functionality to be tracked at pack or component level.

In one embodiment, a retailer can configure whether each complex pack is stored at component or pack level. If inventory is held at component level, a virtual maximum pack number can be calculated, indicating the number of packs that "could" exist in inventory or be re-constituted if needed. Further, this embodiment also allows these complex packs to be counted on a stock count or assigned to transactions even when inventory is held at component level.

In one embodiment, the inventory management system checks an item attribute held at the item master level in the accounting system (i.e., "Store Pack Inventory" indicator 30 of FIG. 1) to determine if inventory should be held at component or pack level. Indicator 30 is displayed in "Item Lookup" detail screens in the inventory management system. Further, another indicator held in the accounting system (i.e., "SOH Inquiry at Pack Level" 32 of FIG. 1) may be used to allow the retailer to view an approximate SOH value for complex packs. For example, since a complex pack includes at least two different items (of which one can be a complex pack in itself), when inventory is held at component level, the inventory management system maintains at least two different SOH values at component level, but may also provide an approximate rolled up SOH value for the complex pack in "Item Lookup." For complex packs that are not flagged as "Store Pack Inventory," inventory is held at component level and each inventory transaction impacts the component SOH regardless of which item of the pack is used for the transaction.

Figure 2:
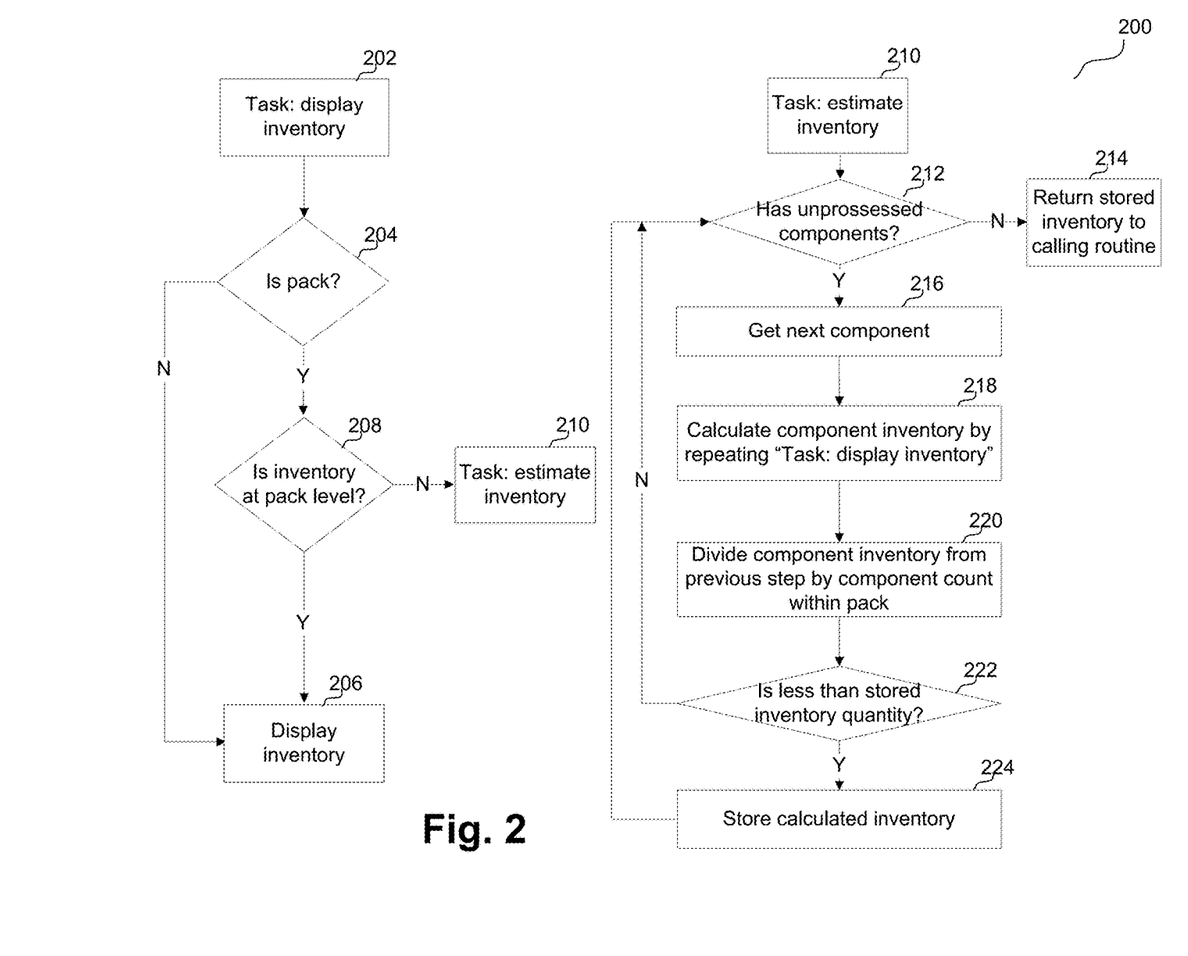
FIGS. 2 and 3 are flow diagrams of the operation of the inventory management module of FIG. 1 when managing complex packs in accordance with embodiments of the present invention.
Figure 3:
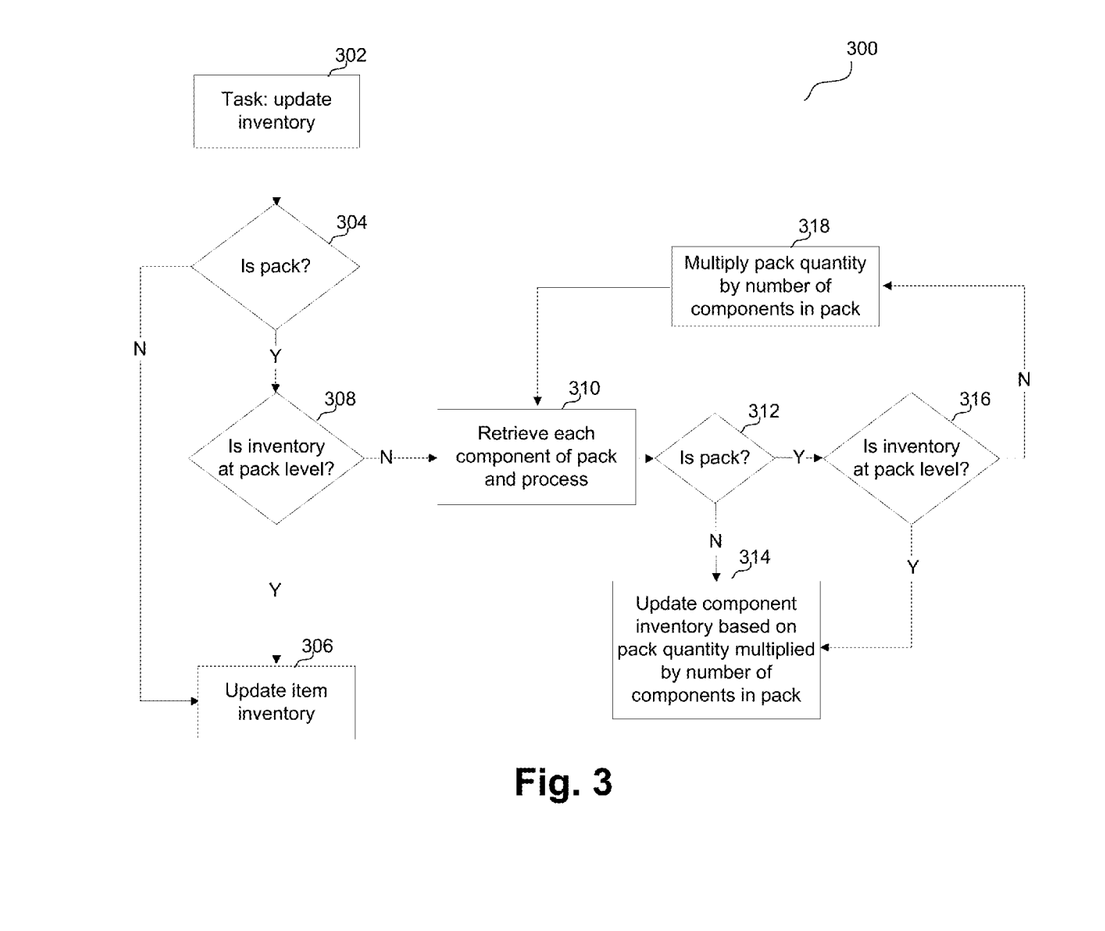

FIGS. 2 and 3 are flow diagrams 200, 300, of the operation of the inventory management module 16 of FIG. 1 when managing complex packs in accordance with embodiments of the present invention. In one embodiment, the functionality of the flow diagrams of FIGS. 2 and 3 (and FIG. 9, described below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Referring to flow diagram 200 of FIG. 2, at 202, the inventory management system determines that the inventory for an item needs to be displayed. For example, the inventory management system may display inventory periodically, or upon receiving a user request via a user interface for display of such inventory.

At 204, the inventory management system determines if the item is a complex pack or not. If the item is not a complex pack, at 206 the item inventory is displayed on the user interface. If the item is a complex pack, at 208 it is determined whether inventory for that complex pack is held at component level or at pack level. For example, the inventory management system may look up a corresponding "Store Pack Inventory" indicator 30 in DB 17 of FIG. 1 to determine whether inventory for the complex pack is held at component level or at pack level.

If inventory for the complex pack is held at pack level, at 206 the pack inventory is displayed on the user interface. If inventory for the complex pack is held at component level, at 210 a task for estimating inventory is initiated. For example, a call may be made to a routine for estimating inventory of a complex pack by processing its components.

In order to estimate inventory for a complex pack for which inventory is held at component level, at 212 the inventory management system determines if the complex pack has any unprocessed components, and if so, at 216 the inventory management system retrieves information for the next unprocessed component from DB 17 of FIG. 1.

At 218, based on the information retrieved at 216, a recursive process is executed for the component to determine its inventory (i.e., repeating the execution of flow diagram 200). Then, at 220 an estimate complex pack inventory is determined by dividing component inventory of the component by the quantity of that component in the complex pack.

At 222, it is determined whether the estimate complex pack inventory is lower than a stored estimate inventory quantity, and if so, at 224 such stored quantity is replaced with the estimate complex pack inventory. The process then loops back to 212 to repeat if there are any more unprocessed components in the pack. When there are no more unprocessed components in the pack, at 214 the process returns the stored inventory quantity to the routine that initiated the "estimate inventory" task.

Referring now to flow diagram 300 of FIG. 3, at 302, the inventory management system determines that inventory needs to be updated for an item. For example, the inventory management system may update inventory upon receiving a sales record from POS device 32 of FIG. 1, or any other inventory adjustment or transaction.

At 304, the inventory management system determines if the item is a complex pack or not. If the item is not a complex pack, at 306 the item inventory is updated at component level based on the sales record or the inventory adjustment or transaction received at 302. If the item is a complex pack, at 308 it is determined whether inventory for that complex pack is held at component level or at pack level. For example, the inventory management system may look up a corresponding "Store Pack Inventory" indicator 30 in DB 17 of FIG. 1 to determine whether inventory for the complex pack is held at component level or at pack level.

If inventory for the complex pack is held at pack level, at 306 the item inventory is updated at pack level based on the sales record or the inventory adjustment or transaction received at 302. If inventory for the complex pack is held at component level, at 310 information for each component of the complex pack is retrieved from DB 17 of FIG. 1 and processed.

At 312, based on the information retrieved at 310, it is determined whether the components are, in turn, complex packs or not. If the components are not complex packs, at 314 inventory is updated based on adjustments in component quantities determined by multiplying component inventory of each component by the quantity of that component in the complex pack. However, if one or more components of the complex pack are indeed complex packs themselves (i.e., child complex packs), then at 316 it is determined whether inventory for each child complex pack is held at component level or at pack level.

A recursive process follows for each child complex pack to determine corresponding adjustments in component quantities. That is, if inventory for a child complex pack is held at component level, at 318 adjustments in component quantities are determined by multiplying component inventory of each component by the quantity of that component in the child complex pack, and the process loops back to 310. If inventory for the child complex pack is held at pack level, the process proceeds to 314 where inventory is updated for the complex pack based on adjustments in component quantities determined by multiplying component inventory of each component by the quantity of that component in the complex pack.

As shown in FIGS. 2 and 3, embodiments allow configurability of holding component or pack level inventory, for simple or multi-tiered complex packs. Further, embodiments provide a recursive algorithm for multi-tiered complex packs to process each child complex pack in a similar manner as the main complex pack.

In one embodiment, the user may scan in a complex pack item, but when a transaction is confirmed, the inventory management system only updates SOH, available, unavailable, shop floor, back room, received, and delivery bay at component level. Such transaction is published to the accounting system at pack level that was scanned. In one embodiment, an orderable only pack is automatically broken down into its components upon receipt in the inventory management system. An orderable only pack is a pack that can only be ordered from the supplier or a warehouse (i.e., cannot be made in the store, for example, end cap display of different sauce packs).

On embodiment provides cross channel functionality (or omni-channel functionality, for example, ordering online, picking up at the store, shipping to the customer directly) where it is allowed to break down items that are set up and sold as complex packs but the retailer wants to purchase the inventory at component level or track inventory at component level (e.g., fuel, hot dogs, etc.).

In one embodiment, if a multi-tiered complex pack is held in inventory at component level, the inventory management system breaks down any complex packs that exist within the main complex pack. However, if the main pack is held in inventory at pack level, the inventory management system does not break down any packs inside that pack.

One embodiment defines whether the user is allowed to scan the component item, the complex pack item, or both. For example, when a shampoo/conditioner set can be sold at component level or as a complex pack, the user may either scan the complex pack or scan each component individually.

In one embodiment, stock count authorization does not display a pack item even if the item was counted at pack level during the count/re-count process. However, during authorization, the inventory management system displays how many packs (rather than components) were counted.

One embodiment estimates pack inventory by looking up "SOH Inquiry at Pack Level" indicator 32 of FIG. 1. This embodiment calculates how many possible complex packs can exist based on the component SOH levels for all components within the pack. If a pack is not flagged as "Store Pack Inventory" exists within a pack that is also not flagged as "Store Pack Inventory," the inventory management system provides an approximate SOH value for both packs.

In one embodiment where the accounting system tracks packs at component level, the "Store Pack Inventory" indicator is a notional indicator defined in the accounting system. The inventory management system by default holds inventory at component level. The "Store Pack Inventory" indicator is displayed on an "Item Lookup Detail" screen for any packs and determines whether or not a pack item will be stored at pack level or broken down to its component s for all inventory transactions. If the indicator is not checked, the inventory management system breaks down the item to its components on the backend and all inventories is held at component level. If the indicator is checked and the pack is sellable, inventory is held at pack level and the pack is not broken down.

In one embodiment, the "SOH Inquiry at Pack Level" indicator is provided in the accounting system for simple and complex packs. The "Store Pack Inventory" indicator and the "SOH Inquiry at Pack Level" indicator are integrated to the inventory management system and control the breakdown of complex packs to their components and the display of an approximate calculated pack SOH value. If the "Store Pack Inventory" indicator is checked in the accounting system when setting up the item, then the item is tracked at pack level in the inventory management system. Example item types that fall under this category are sellable simple and complex packs that can only be sold at pack level (i.e., cannot be broken down and sold at component level).

If the "Store Pack Inventory" indicator is not checked in the accounting system, then inventory is held at component level. Example items types that fall under this category are non-pack items and pack items that can be sold at either pack or component level. If the "SOH Inquiry at Pack Level" indicator is checked in the accounting system and the "Store Pack Inventory" indicator is not checked, the inventory management system provides an approximate value for the pack. Since inventory can be sold at both pack and component levels, the inventory management system may not know the true value of the pack.

In one embodiment, the "Store Pack Inventory" indicator is displayed on the "Item Detail" screen in the "Item Lookup." If a complex pack is set to "Store Pack Inventory" in the accounting system, the item will be flagged as a "Store Pack Inventory" item in the "Item Lookup." If the indicator is unchecked, the pack will be broken down to the next level for any transactions that impact inventory in the inventory management system and it is assumed that the complex pack is sellable. Further, if the indicator is unchecked, the inventory management system breaks down the complex pack item to component level and updates the component SOH, available, unavailable, shop floor, backroom, received, and delivery bay only for transactions that have an impact to inventory. All inventories will be held at component level for these sellable pack items. If the indictor is checked, the sellable complex pack item is not broken down to component level and inventory is held at pack level.

In one embodiment, since a pack item may exist inside a complex pack, the inventory management system needs to handle the breakdown accordingly for items that are not set up as "Store Pack Inventory." If the main pack is not set up as "Store Pack Inventory" but the pack inside of that pack is a "Store Inventory Pack," the main pack is broken down to its components, but the pack inside the main pack is not broken down. If neither pack is flagged as "Store Pack Inventory," both packs are broken down and inventory is held at component level. If the main complex pack is flagged as "Store Pack Inventory," it is not broken down, assuming that if the main complex pack is stored at pack level, then anything inside the main pack cannot be broken down either.

The "Store Pack Inventory" indicator is applied to one or more functional areas such as inventory adjustments, stock counts, transfers, warehouse deliveries, returns, direct store deliveries ("DSD"), retail sales audit file parser, receiver unit adjustments, and all respective web services. Table 1 summarizes the functionality provided in one embodiment based on "Store Pack Inventory" and whether a pack is sellable or not (i.e., the combination of items that forms the pack is sellable as a pack or not).

TABLE 1

Example functionality provided for sellable and non-sellable packs

| Sellable (Y/N) | Store Pack Inventory (Y/N) | Details |
| --- | --- | --- |
| Y | Y | Sellable pack |
|   |   | Sold as pack |
|   |   | Tracked as pack in inventory management system |
| Y | N | Sellable pack |
|   |   | Can be sold as pack or component |
|   |   | Inventory management system tracks inventory at component level |
| N | N | Non-sellable pack |
|   |   | Needs to be broken into components |
|   |   | Inventory management system tracks inventory at component level |
| N | Y | Non-sellable pack |
|   |   | Needs to be broken into components |
|   |   | Inventory management system cannot track inventory at pack level |

The functionality described in Table 1 can be applied to both simple and complex packs. In one example, packs that are sellable only as a pack are tracked at pack level. However, if a pack is a sellable pack but its inventory is held at component level, such pack can be sold as a pack but its components can be sold separately too, and inventory is tracked at component level. If a pack is non-sellable as a pack and its inventory is held at component level, the inventory management system breaks it down to its components and tracks inventory at component level. However, if a non-sellable pack is indicated as "Store Pack Inventory," it is broken down to its components but cannot be tracked at component level.

In one embodiment, the inventory management system displays the transaction level stock keeping unit ("SKU") number that was entered or scanned on a transaction. The user is not restricted from entering the pack item on the transaction and the pack is not substituted with its component items. Further, regardless of the "Store Pack Inventory" indicator in the "Item Lookup," the item number that was entered or scanned is displayed on the transaction. If the complex pack was entered on the transaction, the complex pack item indicator ("ID") will be displayed on the screen with the exception of stock count authorization. That is, on the count authorization screen, the complex pack ID is not displayed, and rather, component IDs are displayed. If the component level item ID is entered, the component item ID will be displayed on the screen.

In one embodiment, a transaction is published to the accounting system at transaction pack level if a pack was scanned, or at component level if the component item was scanned. For packs that are not flagged as "Store Inventory Pack" items, each inventory transaction impacts the SOH of component items regardless of which item is used for the transaction. Sellable complex packs that are not flagged as "Store Pack Inventory" items are published to the accounting system at component level if the component is scanned, or at pack level if the pack is scanned. "Store Pack Inventory" non-sellable complex packs are published to the accounting system at pack level if the pack was scanned. "Store Pack Inventory" sellable complex packs are published to the accounting system at pack level. Simple packs that are flagged or not flagged as "Store Pack Inventory" are published to the accounting system at pack level.

If a pack item is added to a transaction and the "Store Pack Inventory" indicator is not checked, any inventory buckets on the transaction will provide an approximate value even if the "SOH Inquiry at Pack Level" is not set. Inventory could exist at component level and could still be used on the transaction. This is applicable to all pack items that hold inventory at component level (i.e., "Store Pack Indicator" is not checked or the pack is non-sellable).

One embodiment provides inventory inquiry web services. A web service, in general, is a method of communication that allows two software systems to exchange data over the internet. Many organizations use multiple software systems for management, and different software systems often need to exchange data with each other. The software system that requests data is called a "service requester," whereas the software system that would process the request and provide the data is called a "service provider." An inventory inquiry web service is a web service that provides inventory information over the web from a service provider to a service requester. In one embodiment, the inventory inquiry web service provides the sellable unit of measure ("UOM") as well as the calculated pack quantity if required. The web service indicates if any SOH values are approximate/calculated or not.

In one embodiment where cross channel functionality is provided, the bulk inventory web service checks the "Store Pack Inventory" indicator for both simple and complex pack items. For customer orders, when the reserving of inventory takes place, either at the time the order is placed or at the time of receiving, the inventory management system checks the "Store Pack Inventory" indicator to determine if inventory needs to be reserved at the pack or component level. The picking process is not affected, except that for substitute items the reserving and unreserving inventory is determined by the "Store Pack Inventory" indicator. Further, customer deliveries behave the same as transfers and return to vendors ("RTVs") and check the "Store Pack Inventory" indicator to determine whether to update at pack or component level. Reverse picking allows the pack to be on the transaction but updates the components when unreserving inventory if the "Store Pack Inventory" indicator is not checked.

In one embodiment, when a user does not flag an item as "Store Pack Inventory," instead of automatically substituting the pack item with its components in sequencing, product groups, or stock counts, the inventory management system allows the user to enter the simple pack in these areas and keep them there. The user is allowed to sequence both the pack item and the component of that pack, add both the pack item and the component item when creating a product group, or count at pack level or component level.

In one embodiment, the "SOH Inquiry at Pack Level" indicator controls whether or not a calculated SOH value for a complex pack item displays in "Item Lookup" screen for inventory inquiries and web services. If this indicator is set in the accounting system for a pack item that is not flagged as "Store Pack Inventory," the inventory management system displays the approximate calculated value of the sellable or non-sellable complex pack item for the SOH, available, unavailable, shop floor, back room, received, and delivery bay inventory buckets in the "Item Lookup" screen and item inventory inquiry services. If the "SOH Inquiry at Pack Level" indicator is not set in the accounting system, the inventory fields displays as null for the pack. In one embodiment, in the web service message for inventory inquiry, a message is provided to indicate that the SOH for the complex pack item is a calculated value. In one embodiment, in the "Item Lookup" screen or any other screen, a character such as "~" may be displayed next to any value such as each applicable inventory bucket to indicate that it is a calculated value based on the SOH of component items.

In one embodiment, if the "Store Pack Inventory" indicator is not set, the inventory management system breaks down a pack to its component level items through backend processing and updates the SOH only for the component items. Wherever the user is able to enter or add an item in the inventory management application, the user is able to enter at pack item level and the inventory management system breaks it down to component level on the backend. Backend processing converts the pack item to component level by taking the transaction quantity and multiplying it by the number of each component item that makes up the pack. Depending on the type of a transaction, the SOH is updated with an increase or a decrease. For example, when a transaction occurs for a pack item, the inventory management system multiplies the transaction quantity by the number of each component item that makes up the pack, and decrements or increments the SOH value of the component items by that quantity.

In one embodiment, whether or not the "Store Pack Inventory" indicator is checked for a pack item, the retail sales audit file parser or sales web service does not break down sellable complex packs to their component items before sending a file to the inventory management system. When the inventory management system receives that file, the sales file parser of the inventory management system retrieves each item from the file and looks to the "Store Pack Inventory" item indicator to determine if the complex pack item should be broken down to its component items. If the indicator is not set, the pack is broken down to its component items, and a sale decrements inventory while a return or void increments inventory for the component items. This process is repeated until every item that is not flagged as "Store Pack Inventory" on the sales file is converted to the component items. The retail sales audit file parser ensures that the units of the sold item correspond to the units of the component items, and if they do not, the batch converts the sold pack UOM to the component UOM.

FIGS. 4-8 are example screenshots of a user interface during the operation of the inventory management module of FIG. 1 when managing complex packs in accordance with embodiments of the present invention. Example screenshots of FIG. 4-8, as well as any other functionality described herein, may apply to a handheld device, a personal computer, or a POS.

Figure 4:
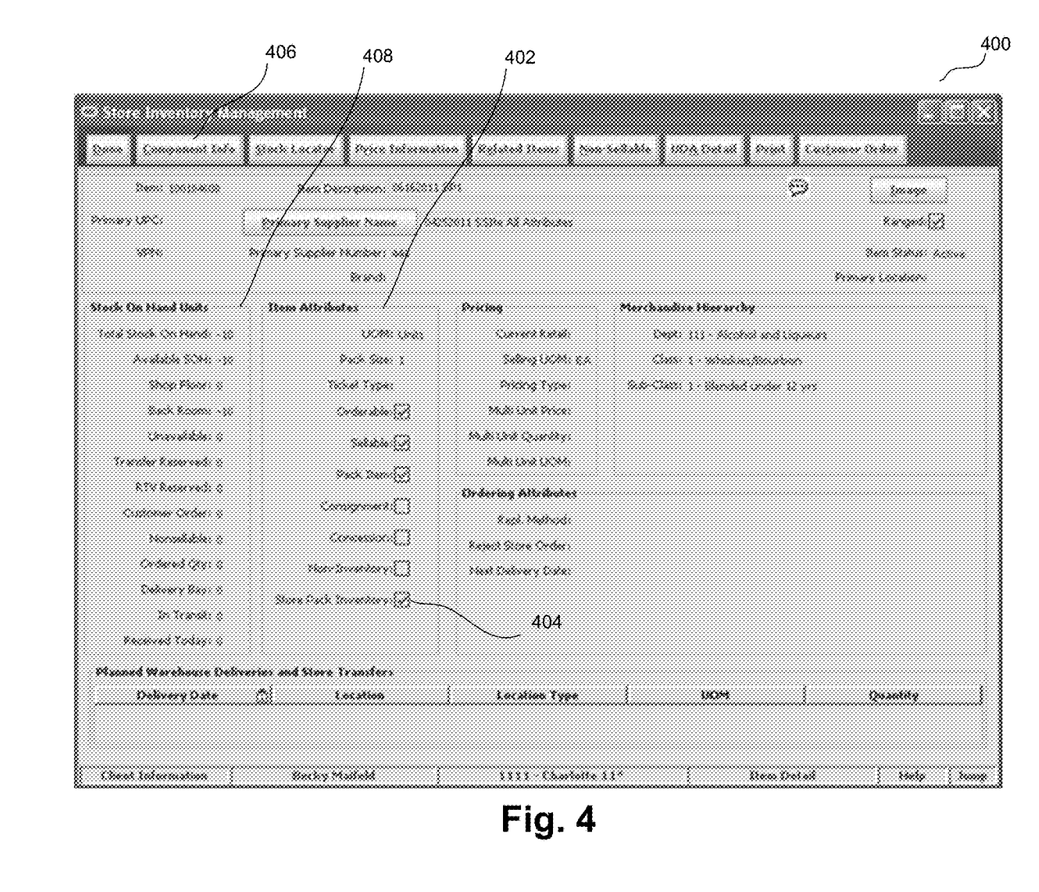
FIGS. 4-8 are screenshots of a user interface during the operation of the inventory management module of FIG. 1 when managing complex packs in accordance with embodiments of the present invention.

Referring to FIG. 4, an example screenshot 400 of an "Item Detail" screen is provided. Screenshot 400 includes an "Item Attributes" section 402 that displays a "Store Pack Inventory" field 404. The user may view the component items by selecting a "Component Info" button 406. "Store Pack Inventory" field 404 is a "view only" checkbox (i.e., the field is disabled). It is checked if the item is flagged in the accounting system as a "Store Pack Inventory" item. If checked, the inventory management system tracks inventory at pack level for the corresponding complex or simple pack. If unchecked, the pack is broken down and tracked at component level.

Screenshot 400 further includes a "Stock on Hand Units" section 408. For a pack item, section 408 displays inventory buckets based on the "SOH Inquiry at Pack Level" indicator at the accounting system. The inventory bucket fields are null for non-ranged items. For a pack item, section 408 displays the following values: total SOH at a store, total available SOH (equals total SOH−reserved transfer quantity−customer order quantity−RTV quantity−unavailable quantity), total unavailable SOH (equals pending inventory adjustments+RTV reserved+transfer reserved+customer order quantity), quantity on the shop floor (calculated by reducing the SOH from the back room and delivery bay quantities), quantity in the back room, quantity received from the warehouse today at the delivery bay (total of shop floor, delivery bay, and back room quantities equals the available inventory at the store), total quantity received at the store today from DSDs, and total nonsellable quantity (how much is unavailable for inventory adjustments). These values are null if "SOH Inquiry at Pack Level" indicator is unchecked at the accounting system. Also, for each of these values, a "~" appears in front of numeric values if "SOH Inquiry at Pack Level" indicator is checked and a calculated value is displayed.

For packs that are flagged as "Store Pack Inventory" items, the following fields display a true value (i.e., not an approximate or calculated value): total quantity on order for the next delivery date, total quantity in transit to the store, transfer reserved (the quantity ear-marked for transfer to another location but not yet shipped), RTV reserved (the quantity ear-marked for returns to warehouse or supplier but not yet shipped), and quantity ordered by the customer but not yet picked up. If "Store Pack Inventory" box 404 is not checked, these inventory buckets reflect the component item and the pack item inventory. That is, the inventory management system looks to the appropriate transactions for both the pack item and its component items, and displays a corresponding summed up value.

For items where "Store Pack Inventory" box 404 is not checked, the inventory buckets in section 408 reflect actual inventory values for the component since pack inventory occurs at component level for non-store pack inventory items. That is, the values are not calculated values.

Figure 5:
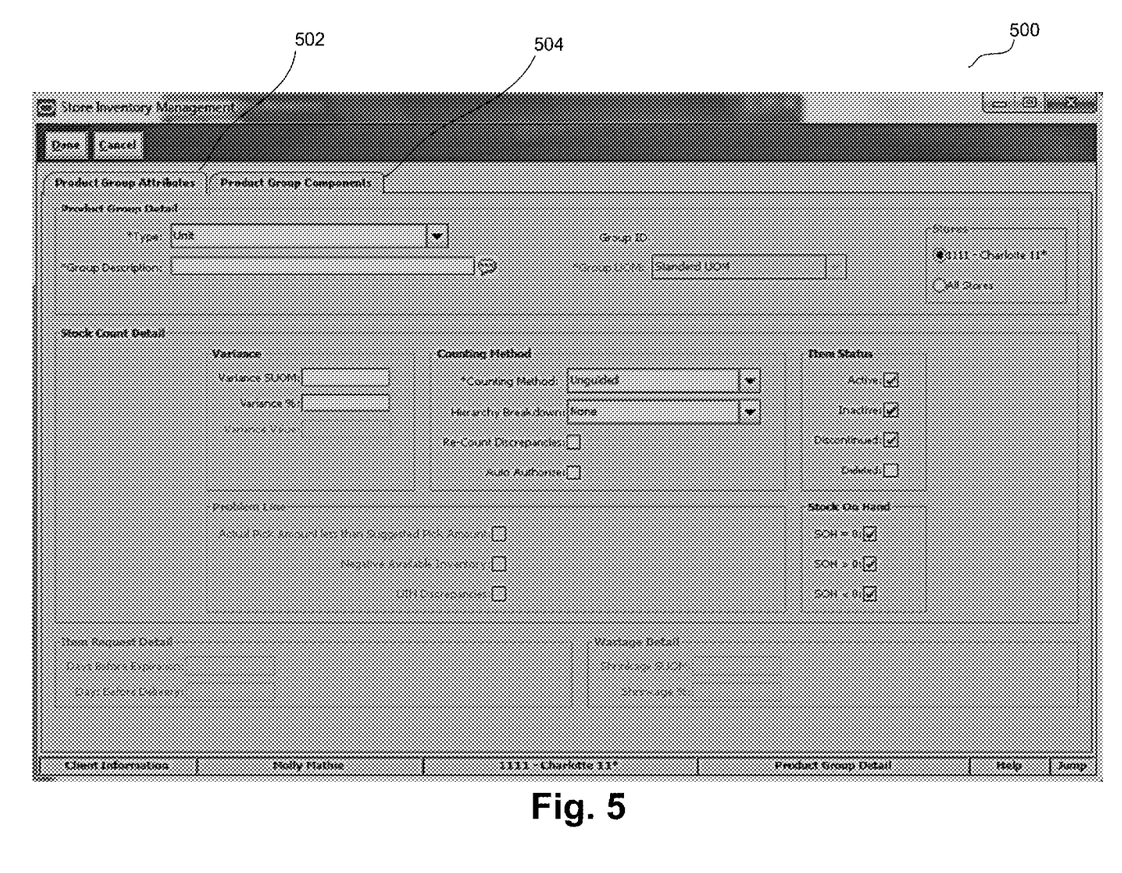

FIG. 5 shows an example screenshot 500 when managing product groups.

Screenshot 500 includes a "Product Group Attributes" tab 502 and a "Product Group Components" tab 504. In this screen, during product group creation in tab 504, a user is allowed to add both a component and a pack item, regardless of whether the "Store Pack Inventory" indicator is flagged or not. The user is also allowed to add sellable and non-sellable packs and/or component items, but is not allowed to add non-inventory items. In order to extract a batch, if a non-sellable pack is added but one or more of its individual components are not added during product group creation, all components are extracted along with the pack regardless of the "Store Pack Inventory" indicator. These rules apply regardless of the item selection method for the product group (i.e., supplier or promotion ID). During product group creation in tab 504:

If a sellable pack not flagged as "Store Pack Inventory" is added but one or more of the individual components in the pack are not added, all components are extracted along with the pack.

If a sellable individual component not flagged as "Store Pack Inventory" is added, the pack and the component are extracted but additional components which are part of the same pack are not extracted.

If a sellable pack flagged as "Store Pack Inventory" is added, only the pack is extracted and the components are not extracted.

If the created product group is based on store departmental hierarchy, the pack and the components of the pack are extracted if they exist within the hierarchy.

If an individual component is part of the product group based on hierarchy but the pack is not part of the same hierarchy, only the component is extracted.

If the created product group is a "Problem Line" product group, the pack and its components are extracted if they have a negative SOH (for example, inventory may drop negative if an item is sold before it is received).

Figure 6:
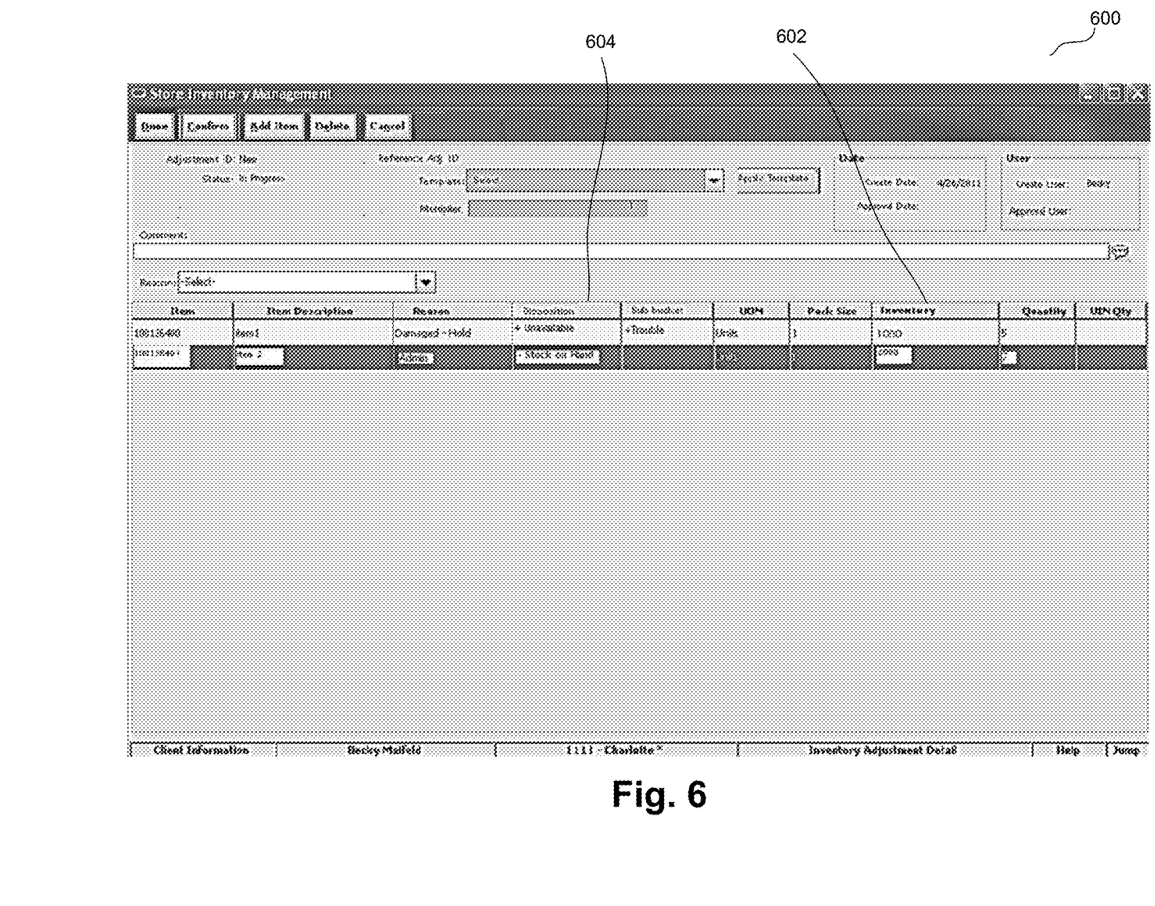

FIG. 6 shows an example screenshot 600 when performing an inventory adjustment. Screenshot 600 includes an "Inventory" field 602 which displays the approximate calculated SOH for a pack item. This is done for pack items where inventory is held at component level. Field 602 represents available or unavailable stock based upon a "Disposition" field 604 that indicates the status of the stock. The user is prompted with a quantity confirmation message if the adjustment quantity is greater than the available SOH. For pack items that are not flagged as "Store Pack Inventory," the inventory management system looks to the available SOH of component items to determine whether or not to prompt the user with the message. If the user is prompted with the message after scanning an item that is not flagged as "Store Pack Inventory" and the user selects "Yes," the SOH of component items are adjusted. The SOH of the component items are also adjusted when creating an inventory adjustment that moves inventory to the unavailable bucket. When creating an adjustment which moves stock from the unavailable bucket and the user enters a quantity that is greater than what is in the unavailable bucket, a hard error message is displayed. For items not flagged as "Store Pack Inventory," the unavailable SOH of the component items is looked up before prompting with this message. Any inventory adjustment or inventory adjustment templates include pack level information.

Figure 7:
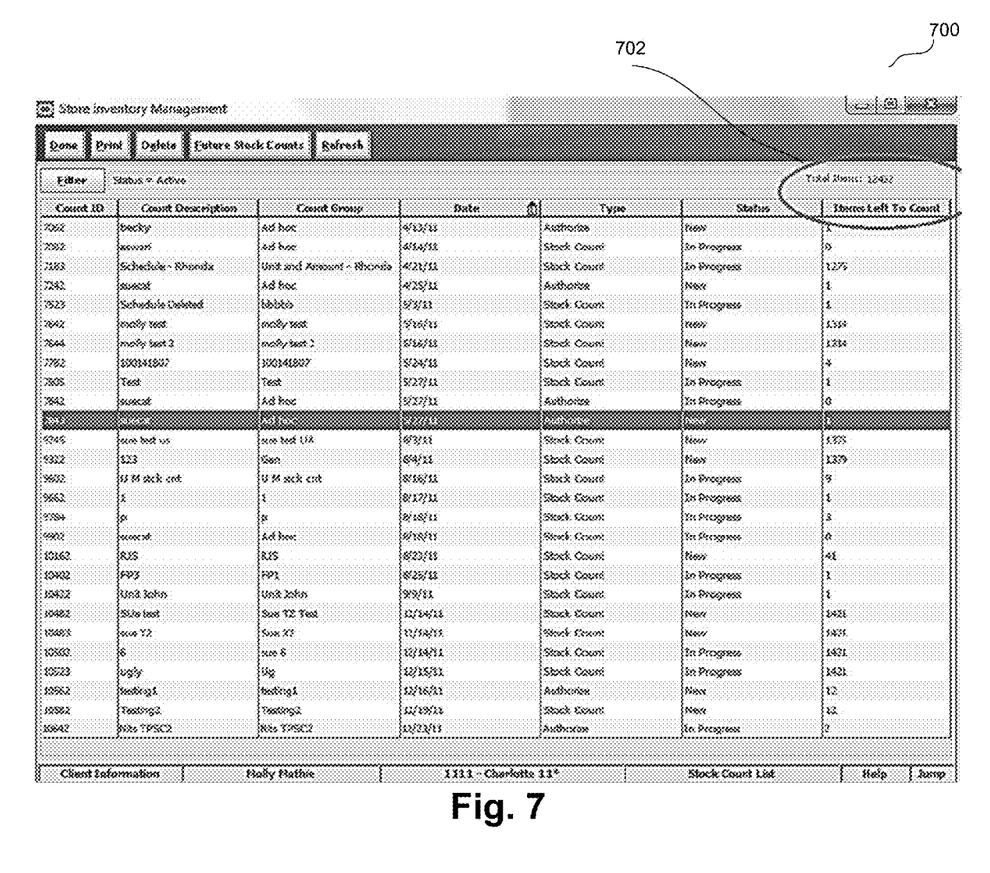
Figure 8:
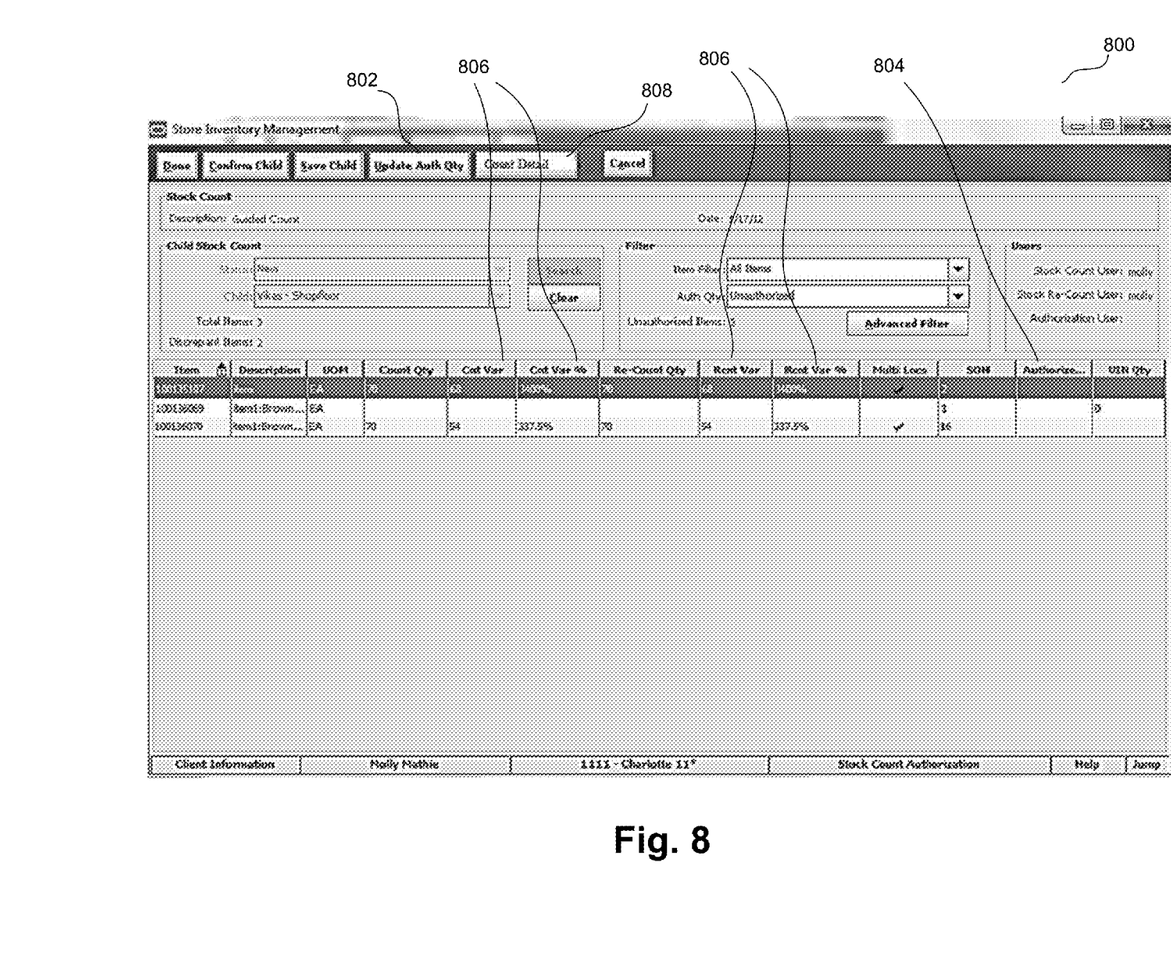

FIGS. 7 and 8 show example screenshots 700 and 800 when performing a stock count. Screenshot 700 is displayed during the count/re-count while screenshot 800 is displayed during authorization. The inventory management system explodes out complex sellable packs and simple packs (sellable and non-sellable) to a stock count if the "Store Pack Inventory" indicator is not checked. The user is allowed to count/re-count both simple and complex pack items that are not flagged as "Store Pack Inventory." Once on the "Authorization Screen" (e.g., screenshot 800 of FIG. 8), the user authorizes the component items since the pack is not on the count. Upon authorization for complex packs that are stored at component level, the primary location of the item is ignored during backend processing.

Screenshot 700 of FIG. 7 includes an "Items Left to Count" field 702 that may vary depending on which stock count screen the user is on. The user is allowed to count/re-count at pack and/or component level. Both the pack and the components are displayed during count and re-count phases assuming they were added during the product group creation. If the user scans the pack, the count quantity of the pack item increases. If the user scans the component, the count quantity of the component item increases. For pack items that are not flagged as "Store Pack Inventory," the components of a pack may exist within a different class/sub-class than the pack itself. This type of pack item may exist in multiple locations within a store even if the count is non-sequenced. Therefore, all stock counts will now follow the same backend processing. When a child count/re-count is completed, the child count moves to pending if the item is located in multiple locations and has not yet been counted in all locations. Discrepancy checking on the backend uses the rolled up quantity of the component items based on how many components and packs were counted.

Referring to FIG. 8, during the stock count authorization process, the component item is used for authorization even if the pack item was counted during the count/re-count phase. This applies for complex and simple packs that are not flagged as "Store Pack Inventory." In this case, only the component appears during authorization and will be a rolled up quantity of both the counted pack quantity and counted component quantity. If an "Update Auth Quantity" button 802 is selected, an "Authorized Qty" field 804 will be updated with the rolled up counted quantity of the pack(s) and component(s). "Variance" columns 806 are based on the rolled up quantity of what was counted for both the pack and the components. For any pack items not flagged as "Store Pack Inventory," the user can view the count quantity for the pack as well as its components by selecting a "Count Detail" button 808.

In one embodiment, when a DSD is received in the inventory management system, the backend processing of breaking down to component items is applied and the SOH of component items is updated for pack items not flagged as "Store Pack Inventory." In one embodiment, if the user is allowed to adjust the delivery, the user may choose to re-open the delivery after it has been received, and the inventory management system adjusts the SOH of component items. If a DSD is adjusted in the accounting system after it has been received, the pack is exploded and the SOH of the component items is updated. In one embodiment, when a warehouse delivery is received in the inventory management system, the SOH of component items is updated for any complex pack items not flagged as "Store Pack Inventory." This applies to receiver unit adjustments as well on a personal computer.

In one embodiment, when creating a transfer or a transfer request, the user is prompted with a message if the transfer quantity or the transfer request quantity is greater than the available SOH. For complex packs that are not flagged as "Store Pack Inventory," the inventory management system looks to the available SOH of component items when determining whether or not to prompt the user with the message, but always adjusts the SOH of component items. A SOH field displays the approximate calculated SOH. This is performed for pack items where inventory is held at component level.

In one embodiment, when receiving a transfer or a receiver unit adjustment, the inventory management system adjusts the SOH of component items on the backend. In one embodiment, when creating a return to warehouse, return to supplier, or return to finisher, the user is prompted with a message if the return quantity is greater than the available SOH. For packs not flagged as "Store Pack Inventory," the inventory management system looks to the available SOH of component items when determining whether or not to prompt the user with the message, but always adjusts the SOH of component items. An "Available SOH" and an "Unavailable SOH" field display the approximate calculated SOH. This is performed for pack items where inventory is held at component level. If unavailable inventory exists for an item and the user creates a return using unavailable inventory, the unavailable inventory is adjusted and the following functionality is performed:

When creating a return that moves stock from the unavailable bucket and the user enters a quantity that is greater than what is in the unavailable bucket, a hard error message is displayed. For packs that are not flagged as "Store Pack Inventory," the unavailable SOH of component items is looked up before prompting with this message.

For complex packs that are not flagged as "Store Pack Inventory," the unavailable SOH of component items is looked up when determining the value to display in the unavailable SOH field for the complex pack item with a "~" appearing in front of the numeric value indicating that it is an approximate value.

In one embodiment, the user is allowed to sequence simple and complex packs and the components of those packs whether or not the item is flagged as "Store Pack Inventory." In one embodiment, for complex packs that are not flagged as "Store Pack Inventory," the user can enter/scan a complex pack or a component item. An "Available SOH" field will display the approximate calculated SOH for the pack item. This is performed for all pack items where inventory is held at component level.

Figure 9:
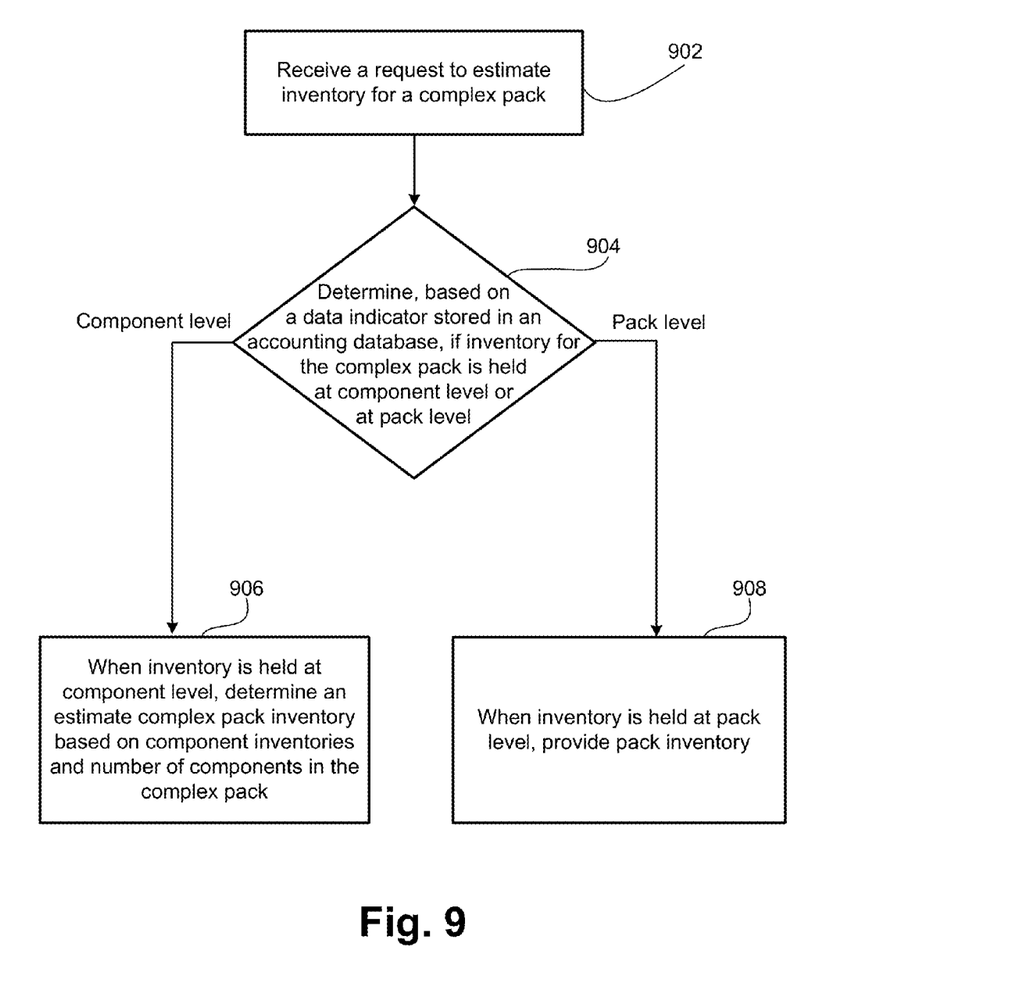
FIG. 9 is another flow diagram of the operation of the inventory management module of FIG. 1 when managing complex packs in accordance with embodiments of the present invention.

FIG. 9 is a flow diagram of inventory management module 16 of FIG. 1 when managing complex packs in accordance with embodiments of the present invention.

At 902, the inventory management system receives a request that a complex pack needs an inventory estimate. For example, a user may request such estimate, or a "build" or "break down" of the complex pack may trigger a request for such estimate. A request may also be automatically and/or periodically generated at certain time instants during the operation of the inventory management system.

At 904, the inventory management system looks up a data indicator stored in an accounting database (e.g., "Store Pack Inventory" Indicator 30 in FIG. 1) to determine whether inventory for the complex pack is held at component level or at pack level.

If inventory is held at component level, at 906 the inventory management system determines an estimate complex pack inventory based on component inventories and number of components in the complex pack. For example, the inventory management system determines estimate inventories by dividing inventory of each component of the complex pack by a corresponding number of the component in the complex pack, and then sets the estimate complex pack inventory to be the lowest value in such estimate inventories. If the complex pack includes any child complex packs, the inventory management system determines estimate inventories for the child complex packs in a similar manner.

If inventory is held at pack level, at 908 the inventory management system displays pack inventory of the complex pack.

The inventory management system may further determine to update inventory for the complex pack based on sales transactions or inventory adjustments received from a POS device. If inventory for the complex pack is held at component level, the inventory management system updates inventories of components of the complex pack based on updates to the complex pack and the number of each component in the complex pack. For example, for a component of the complex pack, the inventory management system determines an update by multiplying the updates to the complex pack by a corresponding number of the component in the complex pack. If the complex pack includes any child complex packs, the inventory management system updates inventory for components of the child complex pack in a similar manner.

As disclosed, embodiments provide configurability by item to hold inventory at pack or component level and calculate a virtual complex pack quantity. This gives the end user the possibility of accurately tracking inventory in the event of "build" or "breakdown" of complex packs.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to perform inventory management for complex packs, the performing comprising:
   receiving a web service request to estimate inventory for a first complex pack that includes a plurality of components, wherein
      an inventory management system manages inventory for a plurality of complex packs that each comprise a plurality of components,
      the inventory management system manages inventory for the first complex pack based on physical scans of the components of the first complex pack, and
      the received request is generated in response to a customer transaction that comprises a build event for the first complex pack or a breakdown event for the first complex pack;
   determining, based on a data indicator stored in an accounting database within an accounting system, whether inventory for the first complex pack is managed at a component level or at a pack level within the inventory management system, wherein, when managed at the pack level, complex packs are not broken down to components within the inventory management system;
   when the inventory for the first complex pack is managed at the component level, determining that one or more components of the first complex pack are child complex packs, and that one or more of the child complex packs is managed at the component level based on data indicators for the child complex packs; and
   estimating a level of first complex pack inventory based on component inventories and a number of components in the complex pack, wherein the estimated level is based on an estimated inventory of components of each of the determined child complex packs.

2. The non-transitory computer-readable medium of claim 1, wherein the determining of the estimate first complex pack inventory comprises:
   for the plurality of components in the first complex pack and each of the child complex packs managed at the component level, determining a plurality of estimate inventories, wherein for a first given component of the first complex pack, an estimate inventory for the first given component is obtained by dividing a corresponding component inventory by a corresponding number of the first given component in the first complex pack, and for a second given component of one of the child complex packs managed at the component level, an estimate inventory for the second given component is obtained by dividing a corresponding component inventory by a corresponding number of the second given component in the one child complex pack; and
   determining the estimate of the first complex pack inventory to be a lowest value in the plurality of estimate inventories for components of the first complex pack.

3. The non-transitory computer-readable medium of claim 1, wherein the performing further comprises:
   determining to update inventory for the first complex pack;
   determining, based on the data indicator stored in the accounting database, whether inventory for the first complex pack is held at component level or at pack level;
   when inventory is held at the component level, updating inventories of components of the first complex pack based on updates to the first complex pack and number of components in the first complex pack; and
   when inventory is held at the pack level, updating inventories at the pack level.

4. The non-transitory computer-readable medium of claim 3, wherein the updating of inventories of the first complex pack components comprises:
   for a component of the first complex pack, determining an update by multiplying the updates to the first complex pack by a corresponding number of the component in the first complex pack.

5. The non-transitory computer-readable medium of claim 3, wherein the updating of inventories of the first complex pack components comprises:
   updating inventory for components of the one or more child complex packs.

6. The non-transitory computer-readable medium of claim 3, wherein the receiving of the request to estimate inventory for the first complex pack or the determining to update inventory for the first complex pack is based on data received from a point of sale device.

7. The non-transitory computer-readable medium of claim 1, wherein at least one of the plurality complex packs managed by the inventory management system is managed at the pack level.

8. The non-transitory computer-readable medium of claim 1, wherein the first complex pack, one or more child complex packs that comprise components of the first complex pack, and components of the one or more child complex packs are each sellable.

9. The non-transitory computer-readable medium of claim 8, wherein the sellable first complex pack, one or more child complex packs that comprise components of the first complex pack, and components of the one or more child complex packs are purchased by customers from one or more retailers using a point of sales device.

10. A method of inventory management for complex packs, comprising:
   receiving a web service request to estimate inventory for a first complex pack that includes a plurality of components, wherein
      an inventory management system manages inventory for a plurality of complex packs that each comprise a plurality of components,
      the inventory management system manages inventory for the first complex pack based on physical scans of the components of the first complex pack, and the received request is generated in response to a customer transaction that comprises a build event for the first complex pack or a breakdown event for the first complex pack;

determining, based on a data indicator stored in an accounting database within an accounting system, whether inventory for the first complex pack is managed at a component level or at a pack level within the inventory management system, wherein, when managed at the pack level, complex packs are not broken down to components within the inventory management system; and when the inventory for the first complex pack is managed at the component level, determining that one or more components of the first complex pack are child complex packs, and that one or more of the child complex packs is managed at the component level based on data indicators for the child complex packs; and estimating a level of first complex pack inventory based on component inventories and a number of components in the complex pack, wherein the estimated level is based on an estimated inventory of components of each of the determined child complex packs.

11. The method of claim 10, wherein the determining of the estimate first complex pack inventory comprises:

for the plurality of components in the first complex pack and each of the child complex packs managed at the component level, determining a plurality of estimate inventories, wherein for a first given component of the first complex pack, an estimate inventory for the first given component is obtained by dividing a corresponding component inventory by a corresponding number of the first given component in the first complex pack, and for a second given component of one of the child complex packs managed at the component level, an estimate inventory for the second given component is obtained by dividing a corresponding component inventory by a corresponding number of the second given component in the one child complex pack; and determining the estimate of the first complex pack inventory to be a lowest value in the plurality of estimate inventories for components of the first complex pack.

12. The method of claim 10, further comprising:

determining to update inventory for the first complex pack;

determining, based on the data indicator stored in the accounting database, whether inventory for the first complex pack is held at component level or at pack level;

when inventory is held at the component level, updating inventories of components of the first complex pack based on updates to the first complex pack and number of components in the first complex pack; and when inventory is held at the pack level, updating inventories at the pack level.

13. The method of claim 12, wherein the updating of inventories of the first complex pack components comprises:

for a component of the first complex pack, determining an update by multiplying the updates to the first complex pack by a corresponding number of the component in the first complex pack.

14. The method of claim 12, wherein the updating of inventories of the first complex pack components comprises:

updating inventory for components of the one or more child complex packs.

15. The method of claim 12, wherein the receiving of the request to estimate inventory for the first complex pack or the determining to update inventory for the first complex pack is based on data received from a point of sale device.

16. A system for inventory management for complex packs, comprising:

a hardware processor configured to:

receive a web service request to estimate inventory for a first complex pack that includes a plurality of components, wherein an inventory management system manages inventory for a plurality of complex packs that each comprise a plurality of components the inventory management system manages inventory for the first complex pack based on physical scans of components of the first complex pack, and the received request is generated in response to a customer transaction that comprises a build event for the first complex pack or a breakdown event for the first complex pack;

determine, based on a data indicator stored in an accounting database within an accounting system, whether inventory for the first complex pack is managed at a component level or at a pack level within the inventory management system, wherein, when managed at the pack level, complex packs are not broken down to components within the inventory management system;

when the inventory for the first complex pack is managed at the component level, determining that one or more components of the first complex pack are child complex packs, and that one or more of the child complex packs is managed at the component level based on data indicators for the child complex packs; and estimating a level of first complex pack inventory based on component inventories and a number of components in the complex pack, wherein the estimated level is based on an estimated inventory of components of each of the determined child complex packs.

17. The system of claim 16, further determines the estimate first complex pack inventory by:

for the plurality of components in the first complex pack and each of the child complex packs managed at the component level, determining a plurality of estimate inventories, wherein for a first given component of the first complex pack, an estimate inventory for the first given component is obtained by dividing a corresponding component inventory by a corresponding number of the first given component in the first complex pack, and for a second given component of one of the child complex packs managed at the component level, an estimate inventory for the second given component is obtained by dividing a corresponding component inventory by a corresponding number of the second given component in the one child complex pack; and determining the estimate of the first complex pack inventory to be a lowest value in the plurality of estimate inventories for components of the first complex pack.

18. The system of claim 16, further determines to update inventory for the first complex pack based on the data indicator stored in the accounting database that indicates whether inventory for the first complex pack is held at component level or at pack level;

when inventory is held at the component level, inventories of components of the first complex pack based on updates to the first complex pack and number of components in the first complex pack are updated; and when inventory is held at the pack level, the determining module updates inventories at the pack level.

19. The system of claim 18, further comprising updating inventories of the first complex pack components by:
   for a component of the first complex pack, determining an update by multiplying the updates to the first complex pack by a corresponding number of the component in the first complex pack.

20. The system of claim 18, further comprising updating inventories of the first complex pack components by:
   updating inventory for components of the one or more child complex packs.

* * * * *

UNITED STATES PATENT AND TRADEMARK OFFICE
CERTIFICATE OF CORRECTION

PATENT NO. : 10,262,284 B2
APPLICATION NO. : 14/565588
DATED : April 16, 2019
INVENTOR(S) : Gooijer et al.

It is certified that error appears in the above-identified patent and that said Letters Patent is hereby corrected as shown below:

In the Specification

In Column 10, Line 59, delete "FIG." and insert -- FIGS. --, therefor.

In Column 11, Line 24, delete "nonsellable" and insert -- non-sellable --, therefor.

Signed and Sealed this
Third Day of November, 2020

Andrei Iancu
*Director of the United States Patent and Trademark Office*